July 31, 1928.

H. A. AFFEL 1,678,665

HIGH FREQUENCY MEASURING SYSTEM

Filed Nov. 21, 1924    2 Sheets-Sheet 1

INVENTOR
H. A. Affel
BY
ATTORNEY

Patented July 31, 1928.

1,678,665

UNITED STATES PATENT OFFICE.

HERMAN A. AFFEL, OF MAPLEWOOD, NEW JERSEY, ASSIGNOR TO AMERICAN TELEPHONE AND TELEGRAPH COMPANY, A CORPORATION OF NEW YORK.

HIGH-FREQUENCY MEASURING SYSTEM.

Application filed November 21, 1924. Serial No. 751,405.

This invention relates to high frequency measuring systems, and particularly to means by which the degree of attenuation or amplification of high frequency currents may be readily ascertained.

As is well known to those familiar with the art, apparatus which is entirely satisfactory for the measurement of low frequency currents proves inadequate when high frequency currents are to be measured. One of the objects of the present invention is to measure high frequency currents and potentials, the method for doing which consists in balancing an unknown direct current potential by a known potential, the direct current potential being produced by rectification or other method of conversion of unknown and known currents, respectively, of frequencies at which it is desired to measure. By translating the alternating currents into proportional direct current potentials and by opposing these potentials in a circuit having a center zero galvanometer, a visual indication of the balance of the high frequency currents is thereby afforded, and it is possible to eliminate serious errors in the testing apparatus heretofore used for the measurement directly of high frequency currents. It should be noted that with all the general methods hereinafter described for the measurement of high frequency alternating currents by translating them into equivalent direct current potentials the quantities balanced are the RMS currents or potentials.

Some of the objects of this invention attainable by using the principle set forth above are: (1) to determine the attenuation of high frequency currents resulting from their propagation over or though a medium; (2) to determine the gain obtainable by an amplifier or an equivalent relaying device when high frequency currents are applied to the said device for amplification; (3) to determine the degree of unbalance existing between two electrical networks at high frequency.

Figure 1:
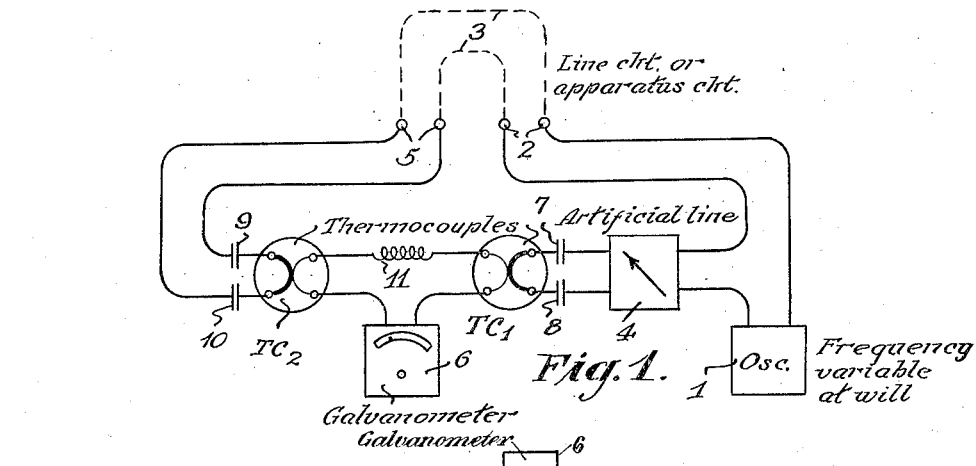
Figure 2:
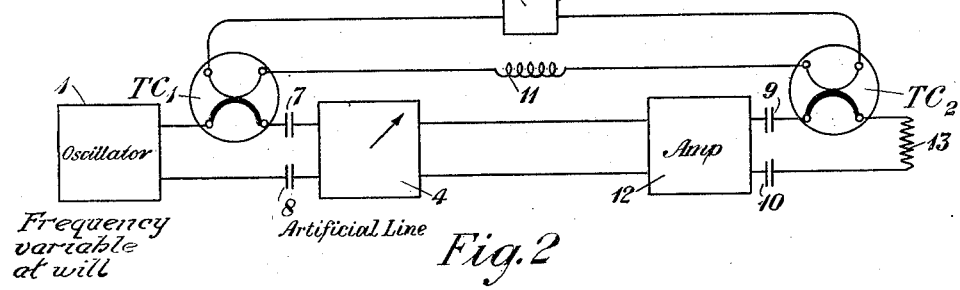
Figure 3:
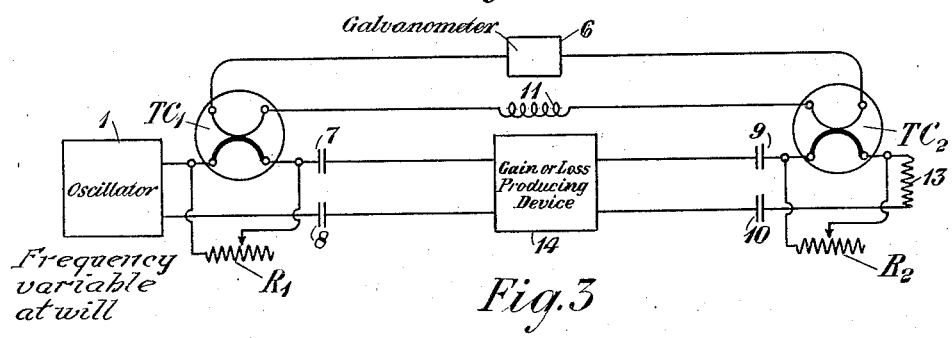
Figure 4:
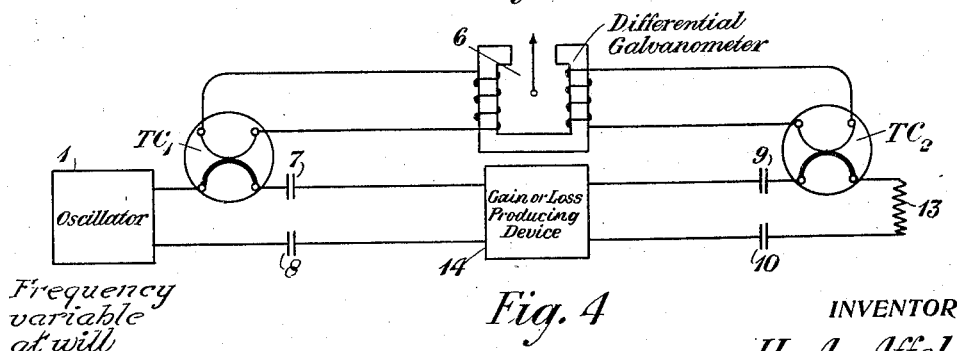
Figure 5:
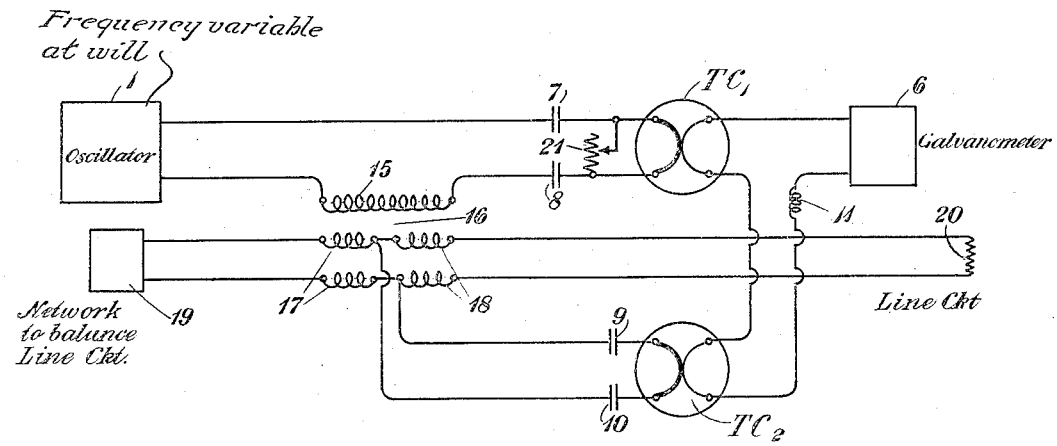

The invention will be clearly understood from the following description when read in connection with the attached drawing of which Figure 1 shows schematically means for making a loop attenuation test where both ends of the circuit or apparatus to be tested are available at the same point; Fig. 2 shows means for measuring the gain of an amplifying device involving the use of the galvanometer having a center zero; Fig. 3 shows a somewhat similar arrangement but differing therefrom in that the thermocouples are not alike; Fig. 4 shows means for measuring losses or gains, the said means involving a differential galvanometer; and Fig. 5 shows schematically means for measurement of unbalance between a line circuit and a network circuit at high frequencies.

The arrangement shown in Fig. 1 is, as stated, designed for measuring the loss occurring in a line circuit or a piece of apparatus where both ends of a circuit or apparatus are available at a single point. In Fig. 1 the oscillator 1 is connected not only with the terminals 2 of the line circuit or apparatus circuit 3, but is also connected with a variable artificial line 4, the output side of which is connected with the thermocouple $TC_1$ through condensers 7 and 8. The receiving end terminals 5 of the line or apparatus 3 are connected with the thermocouple $TC_2$ through condensers 9 and 10. The two thermocouples should be similar, that is to say, equal high frequency currents should produce equal direct current potentials across the direct current sides thereof. The direct current sides of the thermocouples are connected with the galvanometer 6, the connection being such that the direct current potentials will be opposed to each other. The galvanometer is of the center zero type so that the difference of potential may be readily determined. It is desirable to point out that the impedances of the circuit 3 and the variable artificial line 4 must of course be approximately equal in order that the test may be of value. The condensers 7, 8, 9 and 10 serve to keep direct current out of the high frequency circuit, and similarly the inductance 11 serves to keep high frequency currents out of the direct current circuit.

Alternating current of the desired frequency is simultaneously impressed across the terminals 2 of the line circuit or apparatus circuit 3 and also upon the variable artificial line 4. The alternating current impressed upon the line circuit or apparatus circuit 3 will be propagated thereover and will be impressed upon the thermocouple $TC_2$, reducing a direct current potential proportional to the alternating current received by the said thermocouple. The alternating current flowing through the variable artificial line 4 will also produce a direct current potential in the thermocouple $TC_2$ proportional to the said current. These direct current potentials will oppose each other and the resultant potential will produce a deflection of the needle on the galvanometer 6. By varying the constants of the artificial line 4, equality of the direct current potentials may be obtained, which will of course be shown by the zero reading of the galvanometer 6. The attenuation of the line circuit or apparatus circuit 3 is then equal to the attenuation of the artificial line which is known from previous calibration.

In Fig. 2 the source 1 of high frequency oscillations is connected with the thermocouple $TC_1$ and also with the variable artificial line 4 through condensers 7 and 8. This artificial line is in turn connected with the input side of the amplifier 12 and its output side is connected with the thermocouple $TC_2$ and the terminating network 13 through condensers 9 and 10. These thermocouples are preferably similar, that is to say, equal high frequency currents will produce equal direct current potentials across the direct current sides thereof. The direct current terminals of the two thermocouples are connected with the measuring circuit containing the center zero galvanometer 6 in such a manner that the said potentials will oppose each other. An inductance 11 is included in the circuit for the purpose of suppressing high frequency currents therein, thus rendering the measuring instrument free from potentials other than those which are desired to be measured. The high frequency oscillations from the source 1 will be impressed directly upon the thermocouple $TC_1$ and indirectly, that is to say, through the medium of the artificial line 4 and the amplifier 12, upon the thermocouple $TC_2$. Due to the amplification produced by the device 12, the current flowing through the thermocouple $TC_2$ will probably differ from that flowing through the thermocouple $TC_1$ if the artificial line 4 is adjusted to offer no loss. By varying this artificial line the alternating currents through both thermocouples may be made equal, which will be evidenced by the complete neutralization of one direct current by the other, producing thereby a zero reading on the galvanometer 6. The setting of the artificial line dials when this condition obtains represents the gain of the amplifier. In the method herein outlined satisfactory results require that the thermocouples should be carefully chosen so that they will have substantially identical sensitivity and general characteristics. Any deviation in this respect will result in an appreciable error being introduced in the measurement.

The arrangement shown in Fig. 3 is intended to cover the condition where the thermocouples are not similar in their characteristics. In this circuit the oscillator 1 is connected with a device 14, which may produce a loss or a gain. One thermocouple $TC_1$ is connected between the oscillator and the device 14, through condensers 7 and 8, and the other thermocouple $TC_2$ is connected with the output circuit of the said device through condensers 9 and 10, which circuit is terminated by the network 13. The direct current sides of the thermocouple are connected in opposition in the circuit, including the galvanometer 6 and the inductance 11. The thermocouple $TC_1$ is shunted by a variable known resistance $R_1$ and the other thermocouple $TC_2$ by a similar variable resistance $R_2$. High frequency oscillations impressed by the source 1 upon the device 14 will either diminish or amplify the said currents, depending upon whether the device is intended to produce a loss or a gain. Regardless of the character of the device, current in the output side with which the thermocouple $TC_2$ is connected will be different from that in the input side with which the thermocouple $TC_1$ is connected. By varying either or both of the resistances $R_1$ and $R_2$ a condition of equality of the resulting direct current potentials may be produced, which will be evidenced by the balancing of the galvanometer 6. By a proper calibration of the thermocouples the exact loss or gain produced by the device 14 may be determined. This calibration may be effected by disconnecting the said device from the circuit so that both the thermocouples will be affected by the same current. Then one of the resistances $R_1$ or $R_2$ should be varied until the direct current potentials produced by the said thermocouples are substantially equal. The adjustment necessary for overcoming the initial differences between the two thermocouples should be taken into consideration in determining the loss or gain produced by the said device 14.

The arrangement shown in Fig. 4 is in general similar to that shown in Fig. 3, except that a differential galvanometer is used in place of the center zero galvanometer shown in the other figures. In the circuits of Fig. 4 the direct current produced by the thermocouple $TC_1$ will oppose that produced by the other thermocouple $TC_2$. The gain or the loss produced by the device 14 will be measured by the position of the needle of the differential galvanometer which has been previously calibrated. This circuit requires that the thermocouples shall be substantially alike in their characteristics.

As stated above, Fig. 5 shows means of measuring the degree of balance existing between two electrical networks at high frequencies. In the drawing the source of high frequency oscillation 1 is connected with a circuit including the thermocouple $TC_1$ and the primary winding 15 of the triple winding transformer 16 and condensers 7 and 8. This triple winding transformer is preferably of the type known in the art of signaling as a hybrid coil. Connected across the alternating current side of the thermocouple is a variable resistance shunt 21. The secondary windings 17 of the transformer 16 are connected with a balancing network 19 and the secondary windings 18 are connected with the line 20, which is intended to be balanced by the network 19. Connected across the intermediate points between the windings 17 and 18, and through condensers 9 and 10, is the thermocouple $TC_2$. The direct current sides of the thermocouples are connected in polar opposition with the circuit including the galvanometer 6 and an inductance coil 11.

When the high frequency oscillations generated by 1 are impressed upon the circuit connected therewith, high frequency currents will flow through the winding 15 and also through the heater element of the thermocouple $TC_1$. The direct current potential produced in this thermocouple will be impressed upon the galvanometer 6. The current flowing across the winding 15 will produce a potential across the windings 17 and 18 which would tend to cause a flow of current through the network 19 and over the line 20. If the network 19 exactly balances the line 20 there would be no resultant flow of current in the thermocouple $TC_2$ and consequently there would be no direct current potential impressed upon the galvanometer 6. If an unbalance exists between the network 19 and the line 20 such current will flow through the thermocouple $TC_2$ thereby producing a resultant direct current potential which will be impressed upon the circuit containing the galvanometer 6. These thermocouples are so connected with the galvanometer circuit that their polarities are opposed and the deflection of the galvanometer is proportional to the resultant potential. By varying the adjustment of the variable resistance 21 the direct current potential produced by $TC_1$ may be made equal to that produced by the other thermocouple $TC_2$, which equality will be evidenced by the fact that the needle of the galvanometer stands upon its zero position. The setting of the resistance 21 thereby becomes a measurement of the degree of unbalance between the network 19 and the line 20 inasmuch as the current shunted by the said variable resistance 21 is of such magnitude as to effect a balance between the two direct current potentials.

The aforedescribed arrangements show in a variety of ways methods and means for measuring the losses or gains produced by apparatus at high frequencies or the degree of unbalance between two networks without directly measuring the high frequency currents. Errors which were liable to occur with apparatus previously used have been eliminated by translating the high frequency currents into equivalent direct current potentials and in measuring these direct current potentials. By opposing the direct current potentials and employing center zero measuring instruments it is possible to further increase the accuracy of measurement because the null measurement is known to be of greater accuracy than the measurement of the peak of a voltage or current.

While this invention has been disclosed as embodied in particular form it is to be understood that it is capable of embodiment in other forms without departing from the spirit and scope of the appended claims.

What is claimed is:

1. In a gain measuring system, the combination with an amplifier of a source of high frequency current, means to control the magnitude of the current supplied to the said amplifier, thermocouples connected with the input and the output sides of the said amplifier, the direct current sides of the said couples being connected in polar opposition in a circuit having a current indicating device connected therewith.

2. In a gain measuring system, the combination with an amplifier of a source of high frequency current, a thermocouple connected with the input side of the said amplifier, a second thermocouple connected with the output side thereof, a voltage indicating device with which the direct current sides of both thermocouples are connected in polar opposition, and means connected with the input side of said amplifier to introduce a known loss in the amplifier circuit.

3. In a gain measuring system, the combination with an amplifier of a source of high frequency current, an artificial line connected between the said source and the said amplifier, a thermocouple connected between the said source and the said artificial line, a second thermocouple connected with the output side of the said amplifier, and a balance indicating circuit containing a voltage indicating device with which the direct current sides of the said thermocouples are connected in polar opposition.

In testimony whereof, I have signed my name to this specification this 20th day of November, 1924.

HERMAN A. AFFEL.